Oct. 24, 1939.  H. M. NORTHRUP ET AL  2,176,978
VEHICLE AXLE
Filed Oct. 10, 1936  3 Sheets-Sheet 1
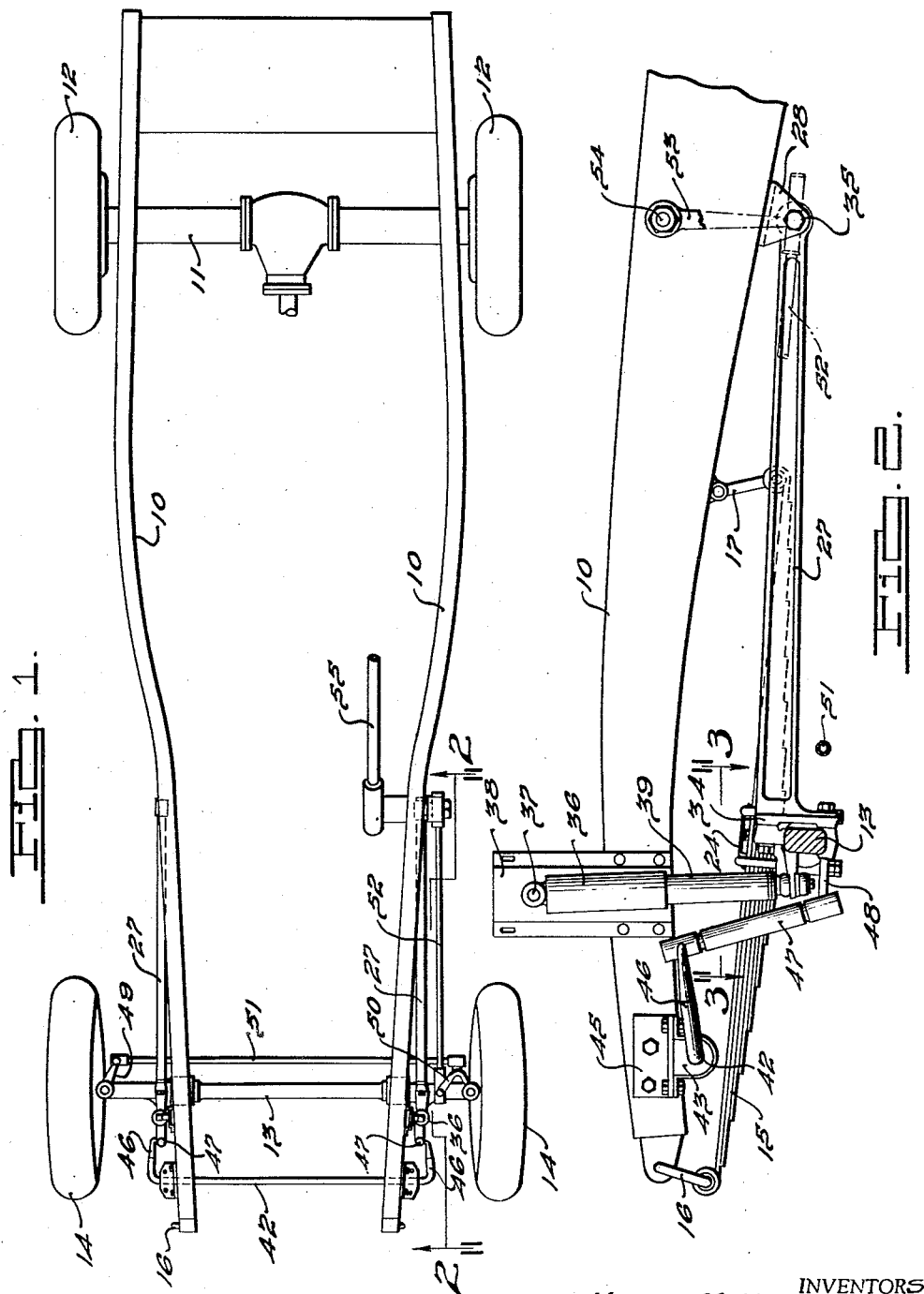
INVENTORS.
Homer M. Northrup,
Arthur F. Bartz,
BY Ralph H. Whisler.
Dike, Calvert & Gray
ATTORNEYS.

Oct. 24, 1939.   H. M. NORTHRUP ET AL   2,176,978
VEHICLE AXLE
Filed Oct. 10, 1936   3 Sheets-Sheet 2
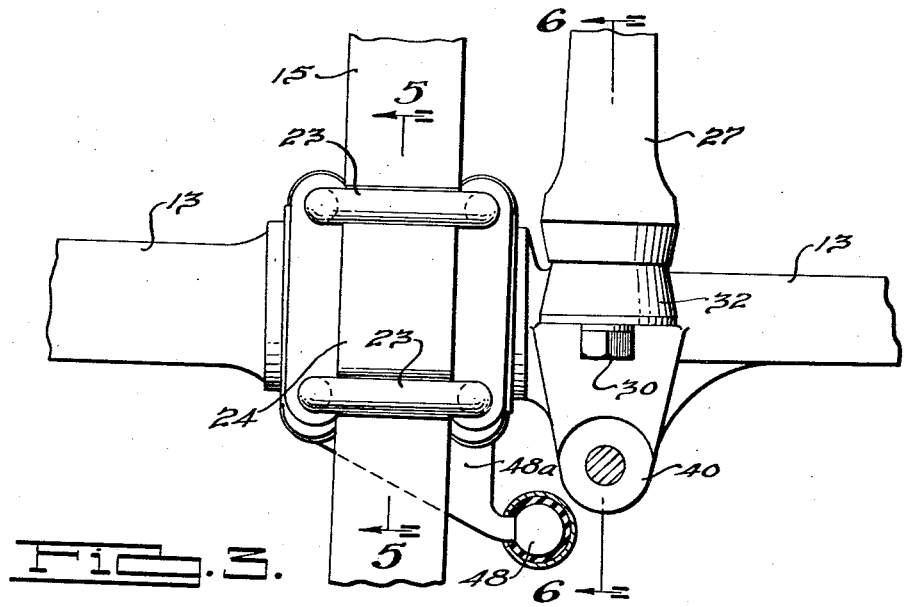
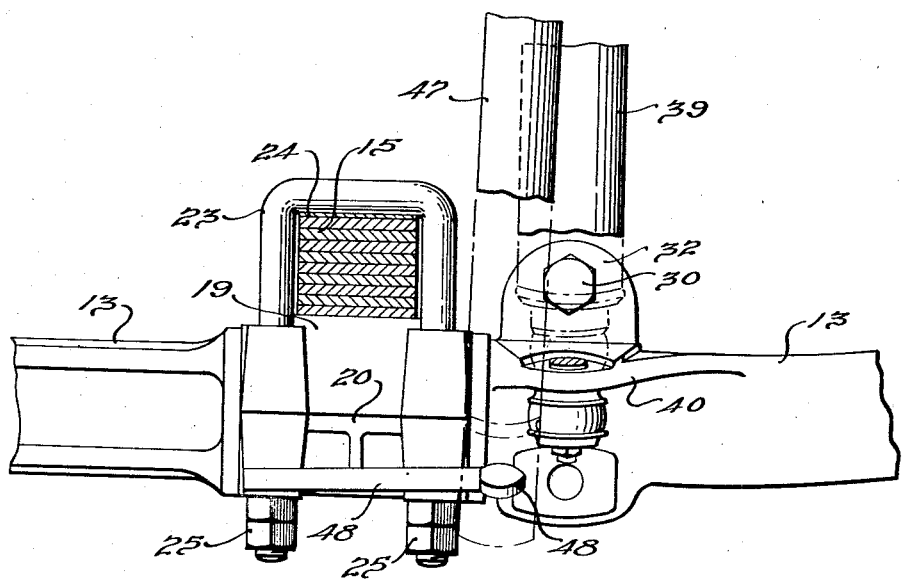
INVENTORS.
Homer M. Northrup,
Arthur E. Bartz,
Ralph H. Whisler.
BY
Dike, Calver & Gray
ATTORNEYS.

Oct. 24, 1939.  H. M. NORTHRUP ET AL  2,176,978
VEHICLE AXLE
Filed Oct. 10, 1936  3 Sheets-Sheet 3
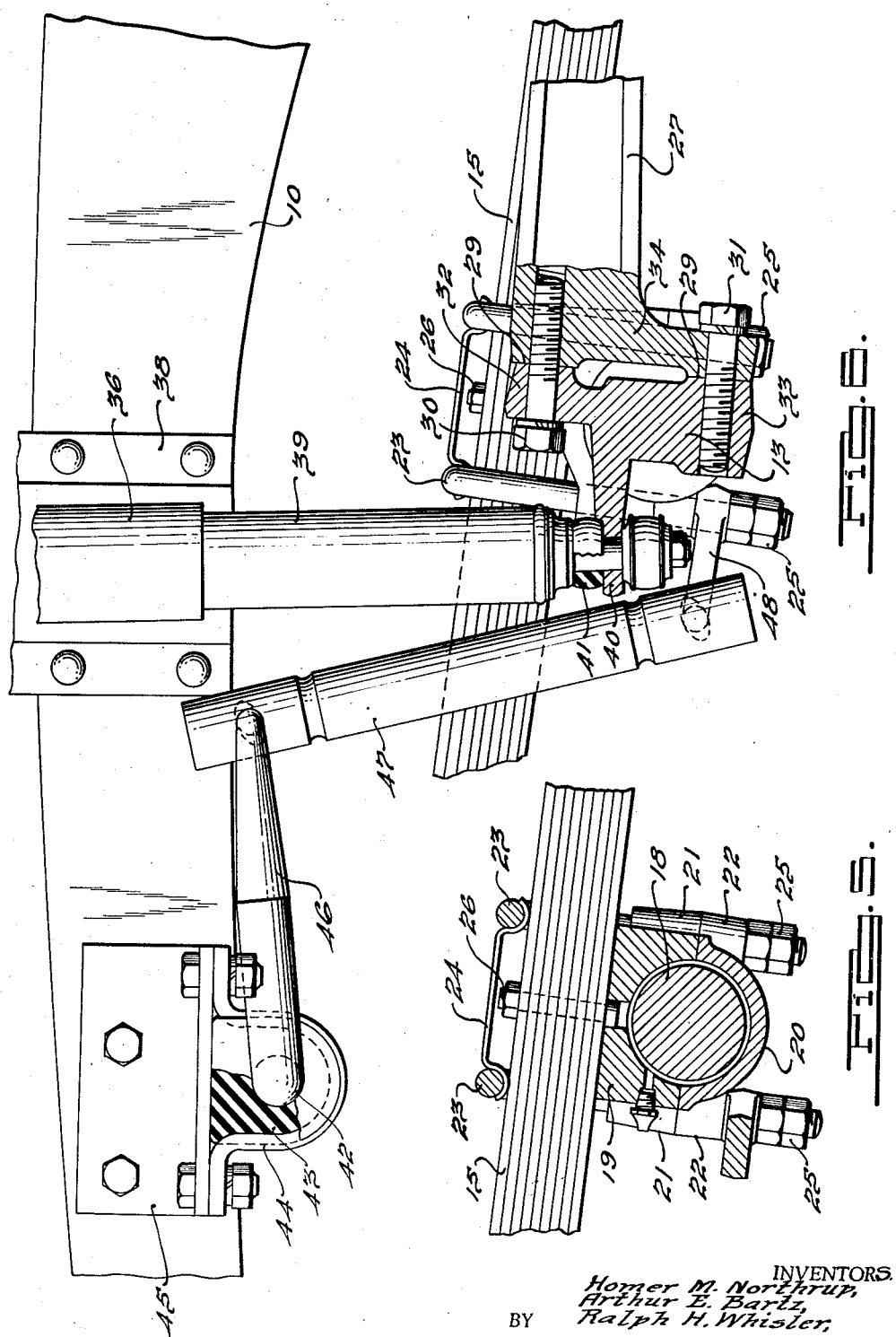
INVENTORS.
Homer M. Northrup,
Arthur E. Bartz,
BY Ralph H. Whisler,
Dike, Calvert & Gray
ATTORNEYS.

Patented Oct. 24, 1939

2,176,978

UNITED STATES PATENT OFFICE 2,176,978

VEHICLE AXLE

Homer M. Northrup and Arthur E. Bartz, Grosse Pointe Park, and Ralph H. Whisler, St. Clair Shores, Mich., assignors to Hudson Motor Car Company, Detroit, Mich., a corporation of Michigan Application October 10, 1936, Serial No. 104,978

6 Claims. (Cl. 267—66)

This invention relates to vehicle axles and more particularly to an improved construction of the front axle for a motor vehicle.

It has been appreciated by those skilled in the art that many serious disadvantages follow from the fact that front springs of automobiles are subjected not only to vertical compression due to the weight of the vehicle, but also to a variety of other stresses which impose additional undesirably distributed loads on said springs. One type of such loads occurs in constructions where forward thrust upon the front axle is transmitted through the longitudinally disposed springs, the same being shackled to the frame of the vehicle at their front ends and hingedly secured directly to the frame at their rear ends. Attempts have been made to solve the problem arising from objectionable uneven distortion of the springs by the use of freely swinging shackles at both ends of the springs and by the provision of so-called radius rods, said radius rods having their front ends rigidly secured to the axle and their rear ends hingedly connected to the vehicle frame, thus providing a thrust connection between the frame and the front axle. This construction eliminated driving thrust load on the springs as well as torsional loads resulting from application of four-wheel brakes, the latter loads also being carried by the radius rods. However, said constructions resulted in a new trouble, namely, causing the imposition of severe torsional loads on the front axle when one wheel moves independently of the other in a vertical direction. Under such conditions the end of the axle, being rigidly secured to the radius rod, must turn in its vertical movement in accordance with the arcuate path of movement of the end of the radius rod. Turning of the axle imposes on the springs additional loads of the very type which was sought to be eliminated. For instance, upward movement of the axle increases greatly compression on the front halves of the springs while relieving compression on the rear ends thereof. Springs had to be made very strong and heavy to withstand these additional loads which, besides increasing the cost of manufacture, operates to decrease the resiliency of the springs, making them too stiff to absorb a larger part of the road shocks. Hence, such shocks are transmitted to the frame, impairing the riding characteristics of the vehicle.

In some constructions it was attempted to solve the above difficulty by cutting the front axle between the points of attachment of the radius rods and the springs and providing resilient connections at such points, thus permitting relative movement of the cut-off or separated ends of the front axle to which the radius rods are attached and the central part of the axle to which the springs are rigidly affixed. One structure designed in accordance with the above plan has the forward ends of the radius rods attached to specially provided wheel-carrying arms telescoped in the ends of a tubular front axle, rubber bushings being provided between said arms and axle, thus permitting restricted relative rotation of the front axle proper and said wheel carrying arms. However, the above constructions did not solve the difficulties encountered, since there still remained a connection between the radius rods and the springs secured to the axle, and such connection despite its resilient characteristics operated to transmit torsional loads to the springs. Since freer vertical movements of front axle were permitted in such constructions, the magnitude of torsional loads imposed on the springs actually tended to be greatly in excess of those imposed on the springs in previous constructions. In addition to the failure to solve the above difficulties these structures introduced other serious disadvantages such as the provision of a very complicated front wheel suspension and the danger of the wheel-carrying arms being pulled out of the front axle by the high side thrust on the steering wheels in taking sharp curves at high speeds.

In our co-pending application Serial No. 40,708, filed September 16, 1935, we have disclosed a novel front wheel suspension in which said difficulty was eliminated without dividing the front axle. The present invention comprehends important improvements over the structure of said application.

One of the objects of the present invention is to provide a novel and improved spring suspension for the front axle of an automobile equipped with radius rods, in which the springs are subjected to vertical compression loads only and are relieved from the additional loads resulting from the torsional stresses normally imposed as a consequence of the independent vertical movements of the wheels, as well as from additional loads imposed on the springs by the end thrust exerted on the axle by the steering wheels, whereby the use of much lighter and softer springs is made possible, and riding characteristics of the vehicle are greatly improved.

Another object of the present invention is to provide a novel front wheel suspension for a motor vehicle, in which means are provided to resist endwise movement of the front axle, such as may occur in turning or because of side road shocks on the steering wheels, whereby steadier and safer steering of the motor vehicle is attained.

A further object of the invention is to provide a structure of the foregoing character which is relatively simple and rugged in construction, relatively economical to manufacture, and capable of being readily serviced when repairs are necessary.

The above and other objects and advantages of the invention will appear from the following description and appended claims when considered in connection with the accompanying drawings forming a part of this specification.

Fig. 1 is a plan view of the chassis of a motor vehicle provided with a front wheel suspension embodying the present invention.

Fig. 2 is a side view, partly in section, of the front wheel suspension, section being taken on the line 2—2 of Fig. 1.

Fig. 3 is an enlarged fragmentary top view of the front axle at the place of connection of the spring and radius rod.

Fig. 4 is a front view of the structure shown in Fig. 3.

Fig. 5 is a sectional view taken on the line 5—5 of Fig. 3 in the direction of the arrows.

Fig. 6 is an enlarged view similar in part to Fig. 2, showing partly in section the method of securing the radius rods and shock absorbers to the axle, as well as the anti-shimmy device employed, section being taken on the line 6—6 of Fig. 3.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is to be understood that the phraseology or terminology employed herein is for the purpose of description and not of limitation, and it is not intended to limit the invention claimed herein beyond the requirements of the prior art.

The front wheel suspension constructed in accordance with one embodiment of the invention comprises generally an integral front axle adapted to carry the steering wheels at its ends; two longitudinally arranged semi-elliptic springs shackled to the vehicle frame at opposite ends and each trunnioned on said axle intermediate its ends; two radius rods rigidly secured to the axle near the ends of the latter and pivotally connected to the vehicle frame; an anti-shimmy device comprising a torsion bar resiliently suspended on the vehicle frame and operatively connected to both ends of the axle. In addition, a shock absorber of conventional design is provided near each end of the axle. Thus the front axle is free to rotate with respect to the springs and in no condition can it impose or transmit any appreciable torsional loads to the springs.

There is illustrated in the drawings, by way of example, a present preferred embodiment of the invention as applied to a motor vehicle having a chassis comprising a frame 10, a rear axle 11 operatively suspended therefrom, rear wheels 12, a front axle 13 and front steering wheels 14 carried by said axle. The axle 13 is suspended from the frame 10 with the aid of two longitudinally extending spring assemblies, each of which comprises a semi-elliptic leaf spring 15 having both ends pivotally connected to the frame 10 in any suitable manner, as by shackles 16 and 17.

Each front spring 15 is trunnioned centrally thereof on the front axle 13 in such a manner as to permit oscillatory movement thereof about the major longitudinal axis of the axle, and the latter in turn is connected through radius rods to the frame 10 at points located preferably below and in substantially the transverse vertical plane of the axis of turning of the pitman arm for the steering mechanism.

The front axle 13, made in the form of an I-beam, is machined to provide a cylindrical bearing portion 18 adjacent each end thereof. A lubricated saddle bearing fits around the cylindrical portion 18, this bearing being split, as illustrated in Fig. 5, to provide upper and lower sections or blocks 19 and 20 having semi-cylindrical interior bearing faces embracing the axle portion 18. The split sections 19 and 20 of the saddle are each provided with laterally projecting alined pairs of bosses or ears 21 and 22, respectively, which are provided with vertical bores for the passage of U-shaped bolts 23. The upper portions of the bolts 23 are seated in a spring pad 24 which bears upon the upper surface of the spring unit 15, while the lower ends of the bolts 23 are threaded to receive nuts 25 which may be turned up to clamp the parts together. The several leaves of the spring 15 are connected together by means of a bolt 26.

The axle 13 at opposite ends thereof is connected to the frame 10 by means of two radius rods or stabilizer bars 27. Said rods or bars are of I-shape section and are hingedly connected to the brackets 28 secured to the frame, the construction in this respect being substantially the same as in our above mentioned application. The stabilizer bars 27 are free to rotate or oscillate in a longitudinal vertical plane, the center of rotation being substantially in the same transverse plane as the axis of turning of the pitman arm of the steering mechanism. The hinge connection of the stabilizer bars to the brackets 28 is of resilient character, preferably in the form of a long rubber bushing provided in order to prevent transmission of shocks and vibrations to the frame from the front axle. At their front ends each of the stabilizer bars 27 abuts against the milled or ground plane surfaces 29 provided on the front axle 13 and is secured thereto by means of oppositely extending bolts 30 and 31 passing through the lugs or bosses 32 and 33 provided on the axle and the widened end 34 of the bar 27. The mating bearing surfaces of the axle and the stabilizer bar are of sufficient area in order to effect a rigid connection between the axle and the stabilizer bar and to prevent relative movement of the bars and the axle. The pins 35 on which the stabilizer bars turn are made sufficiently long to present sufficient resistance to the turning effort of the stabilizer bar caused by end thrusts on the axle. Thus, the front axle is less susceptible to side sway and oscillations of the steering wheels are prevented. Furthermore, the front springs are relieved of considerable loads otherwise imposed on them when the front axle is subjected to end thrusts. It will also be seen that the arrangement of the connecting bolts 30 and 31 is such as to provide not only an effective, reliable connection between the parts but also one that is readily accessible to permit the insertion of shims between the parts at the faces 29 in order to vary the caster of the axle.

In addition to performing the above described function of stiffening the axle assembly in an endwise direction and connecting the front axle to the frame for transmitting the longitudinal driving thrust, the stabilizer bars perform in combination with the trunnioned spring another very important function. From an examination of Fig. 2 it can be seen that the stabilizer bars 27 prevent uncontrolled turning of the axle 13 around its longitudinal axis as well as uncontrolled change of the caster of the steering wheels such as may occur, for example, when the front wheel brakes are applied. The stabilizer bars 26 limit this turning of the axle to a definite amount determined by the length of the bars. The trunnioned springs permitting free rotation of the axle 13 in the saddle bearings do not receive any appreciable torsional load caused by this turning of the axle. Therefore, the springs 13 can be made much lighter and softer and the riding characteristics of the vehicle greatly improved.

Two shock absorbers are provided for the purpose of cushioning the compression and checking the rebound of the springs 15. In the present embodiment of the invention shock absorbers of the telescopic type are employed, and each of them comprises an upper telescopic member 36 hingedly secured as at 37 to a bracket 38 affixed to the frame 10. The lower telescopic member 39 is secured to a boss or lug 40 formed on the axle 13. A rubber washer or cushion 41 is interposed between the lug 40 and the lower telescopic member 39 in order to prevent transmission to the frame of high frequency vibrations which cannot be absorbed by the shock absorbers. Further desription of the shock absorbers is not necessary since any suitable shock absorber may be employed in connection with the present invention.

For the purpose of absorbing the shimmy or rapid small amplitude vibrations of the steering wheels and the axle, there is provided in accordance with the invention an anti-shimmy device. Referring to Figs. 1, 2 and 6, said device comprises a U-shaped torsion bar 42 resiliently suspended from the frame 10. In the present embodiment the bar 42 is supported by two rubber blocks 43 clamped in supporting yokes 44 bolted to brackets 45 affixed to the frame 10. The bar 42 has its ends bent 90° in order to provide cranks 46. The end of each of said cranks is rotatably connected to the upper end of a connecting link 47. The lower end of said link is rotatably connected to an arm 48 secured or integrally formed on the axle 13. We prefer to make finger 48 detachable, and in the present embodiment the same is carried by the saddle bearing to which it is secured with the aid of the U-bolts 23, thus enabling easy replacement in case of breakage.

The steering mechanism for the front wheels 14 may be of any suitable type comprising as illustrated in Fig. 1, steering arms 49 and 50 connected to the steering knuckles of the wheels 14 and connected together transversely by a steering rod 51. The drag link is shown at 52, the rear end of which is connected in the usual manner to a pitman arm 53 pivoted at 54 to the frame 10, the steering mechanism being operated through a shaft 55.

It will now be clear in view of the foregoing that in our novel front axle suspension all connections between the axle and the frame are of the resilient character, and the entire front wheel suspension is of such nature that it is capable of absorbing shocks and vibrations within a very wide range of amplitudes and frequences, namely from small, vary rapid vibrations to severe large amplitude, low frequency shocks. The small rapid vibrations or shimmy are absorbed by the rubber blocks 43 of the anti-shimmy device, rubber cushions 41 of the shock absorbers, and rubber bushings of the pins 35. Vibrations having slightly lower frequencies and larger amplitudes are absorbed by the torsion bar 42 which is twisted by such vibrations. Finally, violent road shocks producing severe spring compressions and rebounds are checked by the shock absorbers.

Due to the fact that the combination of stabilizer bars rigidly secured to the front axle with the springs trunnioned on said axle permits the use of very light and soft springs shackled at both ends, they are capable of absorbing small amplitude, high frequency vibrations. Being assisted in resisting more violent vibrations by the shock absorbers, the springs are capable of absorbing vibrations within the limits of the entire range of vibrations occurring in actual operation conditions.

We claim:

1. In a front wheel suspension for a motor vehicle having a frame, the combination of a front axle, a pair of stabilizer bars pivoted adjacent their rear ends to the frame and having their front ends longitudinally bolted at vertically spaced points in abutting relation to the rear face of the axle, and longitudinal leaf springs rotatably mounted to the axle.

2. In a front wheel suspension for a motor vehicle having a frame, the combination of a front axle, a pair of longitudinal stabilizer bars pivoted adjacent their rear ends to the frame, the forward ends of said bars abutting the rear face of the axle, and oppositely and longitudinally extending bolts rigidly securing each bar to the axle.

3. In a front wheel suspension for a motor vehicle having a frame, the combination of a front axle, a pair of longitudinal stabilizer bars pivoted adjacent their rear ends to the frame, the forward ends of said bars abutting the rear face of the axle, and oppositely and longitudinally extending bolts rigidly securing each bar to the axle, the abutting faces of the bars and axle providing plane surfaces for the reception of shims to vary the caster of the axle.

4. In a front wheel suspension for a motor vehicle having a frame, the combination of a front axle, a pair of longitudinal stabilizer bars pivoted adjacent their rear ends to the frame, the forward ends of said bars abutting the rear face of the axle, bolts rigidly and adjustably securing each bar to the axle, and longitudinal springs trunnioned on said axle.

5. In a motor vehicle, the combination of a front axle, a pair of longitudinal stabilizer bars rigidly secured at adjacent ends to the axle and adjustable relatively thereto to vary the caster of the axle, said bars being pivoted at opposite ends to the vehicle frame structure, and longitudinal springs rotatably connected intermediate their ends to the axle.

6. In a vehicle having a chassis frame and a front axle, the combination of a pair of stabilizer bars rigidly secured to said axle at their extremities, each bar being adjustable upon the axle to permit variation of the caster of the axle, the opposite extremities of the bars being hingedly and resiliently connected to the chassis frame, and a pair of longitudinal springs trunnioned intermediate their ends on said axle.

HOMER M. NORTHRUP.
ARTHUR E. BARTZ.
RALPH H. WHISLER.